US011631514B2

(12) United States Patent
Son et al.

(10) Patent No.: US 11,631,514 B2
(45) Date of Patent: Apr. 18, 2023

(54) SUPERCONDUCTING MAGNET WITH IMPROVED THERMAL AND ELECTRICAL STABILITIES AND METHOD FOR MANUFACTURING THE SAME

(71) Applicant: Korea University Research and Business Foundation, Seoul (KR)

(72) Inventors: Hyunhee Son, Seoul (KR); Haigun Lee, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 642 days.

(21) Appl. No.: 16/229,157

(22) Filed: Dec. 21, 2018

(65) Prior Publication Data
US 2019/0206600 A1 Jul. 4, 2019

(30) Foreign Application Priority Data

Dec. 29, 2017 (KR) .................. 10-2017-0184824
Dec. 3, 2018 (KR) .................. 10-2018-0153341

(51) Int. Cl.
| | |
|---|---|
| *H01F 6/02* | (2006.01) |
| *H01F 41/12* | (2006.01) |
| *H01F 41/04* | (2006.01) |
| *H01F 6/06* | (2006.01) |
| *C08K 3/04* | (2006.01) |
| *C01B 32/168* | (2017.01) |

(52) U.S. Cl.
CPC ............ *H01F 6/02* (2013.01); *C01B 32/168* (2017.08); *C08K 3/041* (2017.05); *H01F 6/06* (2013.01); *H01F 41/048* (2013.01); *H01F 41/127* (2013.01)

(58) Field of Classification Search
CPC ....................................................... H01F 6/02
See application file for complete search history.

(56) References Cited

U.S. PATENT DOCUMENTS

| | | | | |
|---|---|---|---|---|
| 2006/0166003 | A1* | 7/2006 | Khabashesku | ...... D06M 13/196 428/408 |
| 2009/0215953 | A1* | 8/2009 | Hwang | ................. C01B 32/174 524/496 |
| 2012/0261620 | A1* | 10/2012 | Richter | ................. B82Y 40/00 252/500 |
| 2013/0087277 | A1* | 4/2013 | Chang | .................... C09J 163/00 156/273.9 |
| 2015/0015260 | A1* | 1/2015 | Harrison | ................... H01F 6/06 324/318 |
| 2016/0315331 | A1* | 10/2016 | Yoshiwara | .......... H01M 8/0234 |

FOREIGN PATENT DOCUMENTS

| | | |
|---|---|---|
| KR | 10-2006-0119561 A | 11/2006 |
| KR | 10-1665038 B1 | 10/2016 |

* cited by examiner

*Primary Examiner* — Paul A Wartalowicz
(74) *Attorney, Agent, or Firm* — NSIP Law

(57) ABSTRACT

Disclosed is a superconducting magnet with improved thermal and electrical stabilities and a method for manufacturing the same. The superconducting magnet includes a bobbin disposed at a center of the superconducting magnet, a superconducting winding wound around an outer face of the bobbin, and an epoxy impregnated at an exterior of the superconducting winding, wherein the epoxy contains carbon nanotubes.

3 Claims, 5 Drawing Sheets

(a)  (b)

SUPERCONDUCTING MAGNET WITH IMPROVED THERMAL AND ELECTRICAL STABILITIES AND METHOD FOR MANUFACTURING THE SAME

CROSS-REFERENCE TO RELATED APPLICATIONS

A claim for priority under 35 U.S.C. § 119 is made to Korean Patent Application Nos. 10-2017-0184824 filed on Dec. 29, 2017, and 10-2018-0153341 filed on Dec. 3, 2018, in the Korean Intellectual Property Office, the entire contents of which are hereby incorporated by reference.

BACKGROUND

Embodiments of the inventive concepts described herein relate to a superconducting magnet and a method for manufacturing the same, and more particularly, relate to a superconducting magnet with improved thermal and electrical stabilities by inserting a filler in an impregnating material of the superconducting magnet used at a very low temperature and a method for manufacturing the same.

As research on high magnetic field develops, a superconducting magnet has been applied not only in medical field but also in electric power and energy field. Generally, in case of a low-temperature superconducting magnet, or a magnet used for rotation of a motor or a generator, etc., the magnet is impregnated with an epoxy for a very low temperature. Impregnating the superconducting magnet with the epoxy relaxes the Lorentz force of the magnet. Further, impregnating the superconducting magnet with the epoxy allows the magnet to withstand mechanical vibration that occurs when applied to a machine such as a motor or a generator.

However, in a case of the typical superconducting magnet, heat may not be efficiently diffused when local heat is generated.

FIG. 1 is a diagram schematically illustrating heat generation in a typical superconducting magnet due to a quench.

Existing superconducting magnet has an epoxy surrounding a superconducting winding such that the superconducting winding is impregnated in the epoxy. When local heat is generated in a specific region due to an unspecified cause, the heat must be properly diffused, and cooled immediately.

However, due to a low thermal conductivity of the epoxy material, it is often that the generated heat is not efficiently diffused, and the superconducting magnet is damaged.

In addition, in cooling, due to difference in thermal shrinkage between the superconducting winding and the epoxy as the impregnation material, mechanical internal stress is generated in a coil, resulting in degradation of superconductive property.

Therefore, it is required to develop a superconducting winding that, when the local heat is generated in the specific region, may efficiently diffuse the heat, and prevent the degradation of the superconductive property by reducing the difference in the thermal shrinkage during the cooling.

SUMMARY

Embodiments of the inventive concepts provide a superconducting magnet that is able to solve a problem that, when local heat is generated at the superconducting magnet impregnated with a conventional epoxy, the heat may not be efficiently diffused due to a low thermal conductivity of the epoxy material.

Embodiments of the inventive concepts provide a superconducting magnet that reduces a difference in a thermal shrinkage between a superconducting winding and the epoxy surrounding the winding in an impregnating manner. In this connection, a mechanical internal stress may occur due to the difference in the thermal shrinkage when the superconducting magnet is cooled.

According to an exemplary embodiment, a superconducting magnet includes a bobbin defining a central portion of the superconducting magnet, a superconducting winding wound around an outer face of the bobbin, and an epoxy surrounding the superconducting winding such that the superconducting winding is impregnated in the epoxy, wherein the epoxy contains carbon nanotubes.

According to an exemplary embodiment, the carbon nanotubes are subjected to surface treatment such that the carbon nanotubes are dispersed in the epoxy.

According to an exemplary embodiment, the surface-treatment of the carbon nanotubes includes heat-treating the carbon nanotubes in a solution containing sulfuric acid and nitric acid to form a COOH functional group on surfaces of the carbon nanotubes.

According to an exemplary embodiment, a content of the carbon nanotubes is in a range of 0.1 to 5 wt % based on a total weight of the epoxy.

According to an exemplary embodiment, a method for manufacturing a superconducting magnet includes providing a bobbin defining a central portion of the superconducting magnet, winding a superconducting wire around an outer face of the bobbin to form a superconducting winding, and impregnating the superconducting winding with an epoxy such that the epoxy surrounds the superconducting winding, wherein the epoxy contains carbon nanotubes.

According to an exemplary embodiment, the carbon nanotubes are subjected to surface treatment such that the carbon nanotubes are dispersed in the epoxy at an increased dispersity.

According to an exemplary embodiment, the surface-treatment of the carbon nanotubes includes heat-treating the carbon nanotubes in a solution containing sulfuric acid and nitric acid to form a functional group on surfaces of the carbon nanotubes.

According to an exemplary embodiment, a content of the carbon nanotubes is in a range of 0.1 to 5 wt % based on a total weight of the epoxy.

According to an exemplary embodiment, inclusion of the carbon nanotubes in the epoxy improves thermal and electrical stabilities of the superconducting magnet, and reduces a difference in thermal shrinkage between the superconducting winding and the epoxy to prevent degradation of superconductive property of the magnet.

According to an embodiment of the inventive concept, the thermal conductivity of the epoxy is improved by impregnating the superconducting magnet with the epoxy containing the surface-treated carbon nanotube. Thus, when local heat is generated, the heat is efficiently diffused, thereby improving the thermal and electrical stabilities of the superconducting magnet.

In addition, the superconducting magnet with improved thermal and electrical stabilities and the method for manufacturing the same according to the inventive concept may prevent degradation of superconductive property by reducing the difference in the thermal shrinkage between the superconducting winding and the epoxy that occurs during cooling.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, embodiments of the inventive concept will be described in more detail with reference to the accompanying drawings. The embodiment of the inventive concept may be modified in various ways, and the scope of the inventive concept should not be construed as being limited to the embodiments below. The embodiments are provided to only make the disclosure of the inventive concept complete and fully inform those skilled in the art to which the inventive concept pertains of the scope of the inventive concept. The shape of the elements in the figures is therefore exaggerated to more clearly illustrate the inventive concept.

The inventive concept relates to a superconducting magnet with improved thermal and electrical stabilities, and a manufacturing method of the same. The superconducting magnet includes: a bobbin defining a central portion of the superconducting magnet; a superconducting winding wound around an outer face of the bobbin; and an epoxy surrounding the superconducting winding such that the superconducting winding is impregnated in the epoxy, wherein the epoxy contains carbon nanotubes.

Figure 1:
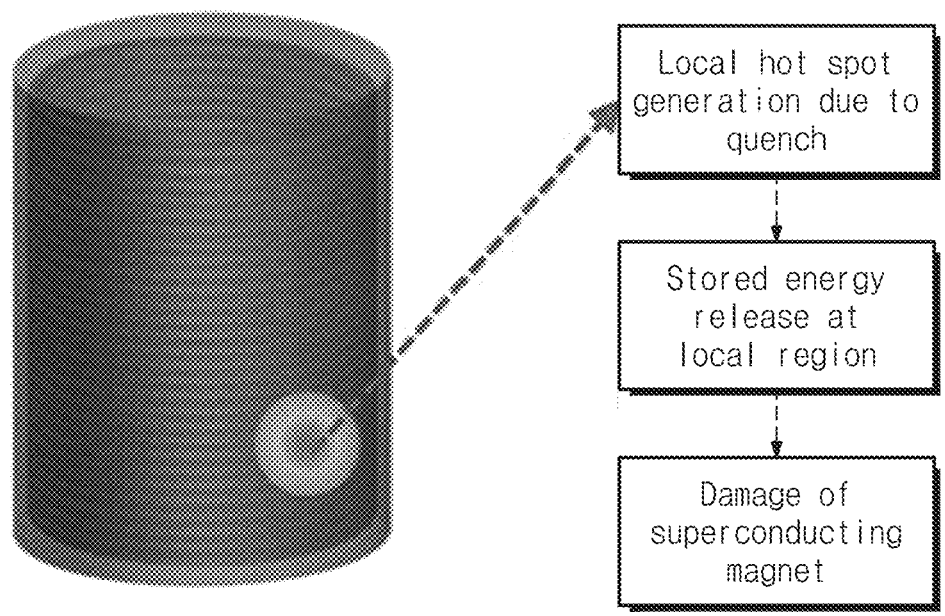
FIG. 1 is a diagram schematically illustrating heat generation in a typical superconducting magnet due to a quench.
Figure 2:
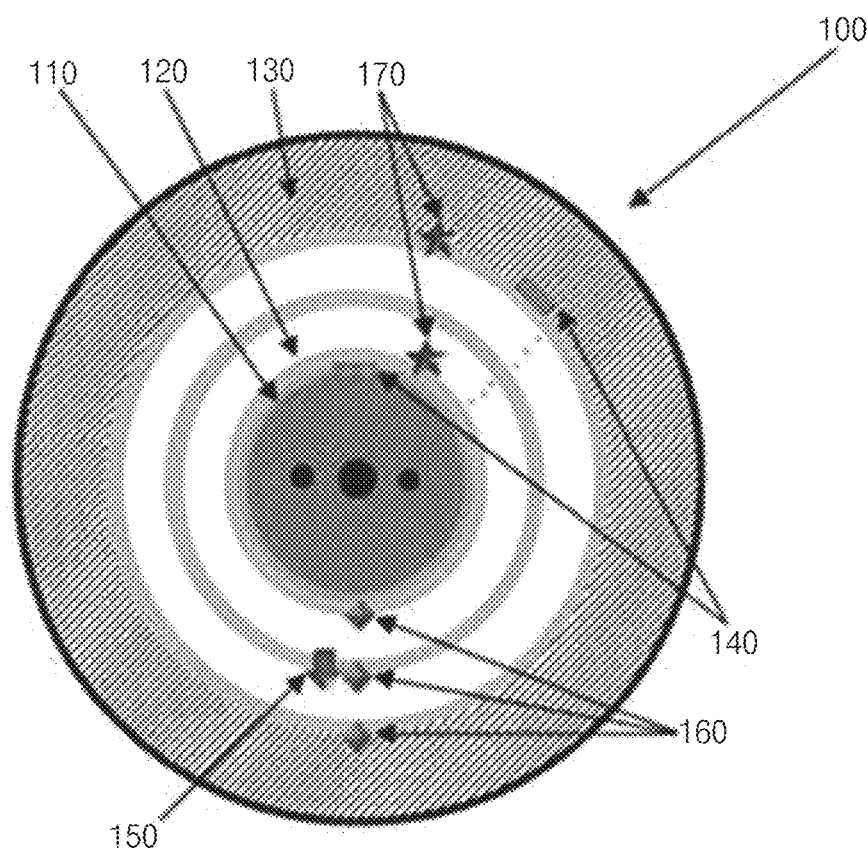
FIG. 2 is a cross-sectional view of a superconducting magnet according to an embodiment of the inventive concept.

FIG. 2 is a cross-sectional view of a superconducting magnet according to an embodiment of the inventive concept.

A superconducting magnet 100 may include a bobbin 110, a superconducting winding 120, and an epoxy impregnation 130.

The bobbin 110 defines the central portion of the superconducting magnet 100. In addition, a bakelite material having a low thermal conductivity may be used as the bobbin.

In addition, the superconducting winding 120 may be formed along the outer face of the bobbin 110. The superconducting winding 120 may be wound around the bobbin several times.

The superconducting winding 120 may include both a low temperature superconductor having superconductivity at a temperature less than 30K, and a high temperature superconductor having superconductivity at a temperature of 30K or more. In the superconducting winding 120, a current may flow without a resistance at a temperature lower than or equal to a critical temperature of the superconducting material.

The superconducting winding 120 is surrounded with the epoxy 130 such that the superconducting winding 120 is impregnated in the epoxy 130. A surface-treated carbon nanotube may be added to the epoxy.

When local heat is generated in the superconducting winding 120 included in the superconducting magnet, the superconducting magnet needs to increase stabilities of the superconducting magnet by efficiently diffusing the heat. Otherwise, the superconducting winding 120 may lose superconductivity, and resistance may increase due to the heat.

Thus, in the inventive concept, the superconducting winding 120 was surrounded with the epoxy such that the superconducting winding is impregnated in the epoxy. Further, a carbon nanotube with a high thermal conductivity was added to the epoxy. When the carbon nanotube is added to increase a thermal conductivity of the epoxy, the heat may be efficiently diffused, thereby improving thermal and electrical stabilities of the superconducting magnet 100.

In addition, the difference in the thermal shrinkage between the superconducting winding 120 and the epoxy 130 for a very low temperature may generate a mechanical internal stress in the superconducting magnet 100 when the superconducting magnet is cooled. The mechanical internal stress may cause degradation of superconductive property of the superconducting magnet 100. Thus, by adding the carbon nanotube to the epoxy 130, the difference in the thermal shrinkage between the superconducting winding 120 and the epoxy 130 may be reduced.

In the inventive concept, a surface-treated carbon nanotube may be used as the carbon nanotube contained in the epoxy to increase dispersivity within the epoxy.

Figure 3:
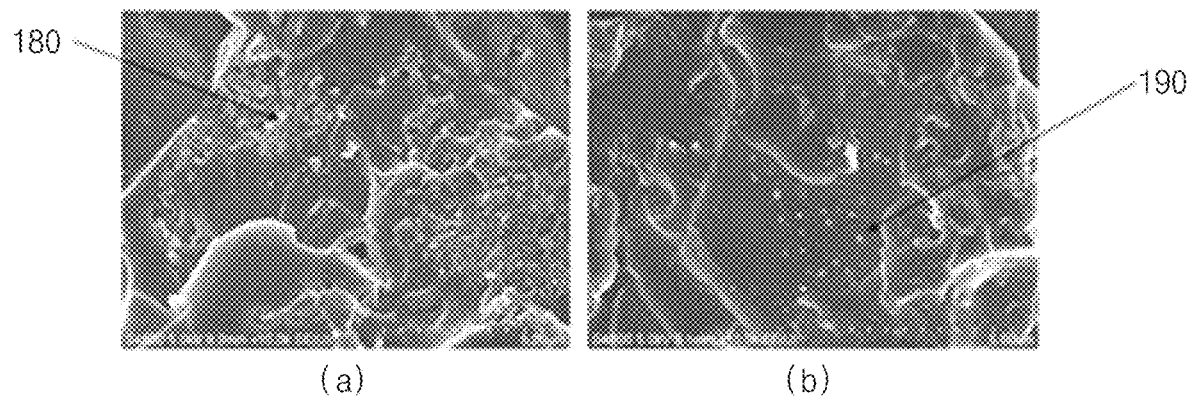
FIG. 3 is SEM images of an epoxy with a non-surface-treated carbon nanotube, and with a surface-treated carbon nanotube.

FIG. 3 is SEM images of an epoxy with a non-surface-treated carbon nanotube, and with a surface-treated carbon nanotube.

With reference to FIG. 3, when carbon nanotubes that are not surface-treated 180 are added, the carbon nanotubes are not uniformly dispersed in the epoxy 130 (See FIG. 3A). In this case, since the carbon nanotubes having a high thermal conductivity exist only in a certain region, and are not uniformly dispersed, it is difficult to expect efficient thermal conductivity improvement.

On the other hand, when the carbon nanotubes are surface-treated, the carbon nanotubes are formed to uniformly dispersed in the epoxy.

Sulfuric acid and nitric acid may be used for the surface-treatment of the carbon nanotube. A surface-treated carbon nanotube 190 may be obtained through a heat treatment of the sulfuric acid and the nitric acid at a mass ratio of 3:1 at about 100° C. for about 30 minutes.

After the heat treatment for about 30 minutes, the sulfuric acid and the nitric acid are filtered through a membrane to obtain the surface-treated carbon nanotube 190. When the carbon nanotube is surface-treated, COOH functional group is formed to the carbon nanotube, thereby improving dispersity among the carbon nanotubes in the epoxy.

That is, the functional group is formed on a surface of the carbon nanotube through the surface-treatment, thus the dispersity of the carbon nanotubes in the epoxy 130 may be improved (See FIG. 3B).

Further, in the inventive concept, the carbon nanotube is contained in the epoxy, and a content of the carbon nanotube contained in the epoxy is preferably 0.1 to 5 wt % based on a total weight of the epoxy. When the carbon nanotube is contained in the above range, a thermal conductivity of the epoxy is increased, so that when local heat is generated, the heat may be efficiently diffused.

Figure 4A:
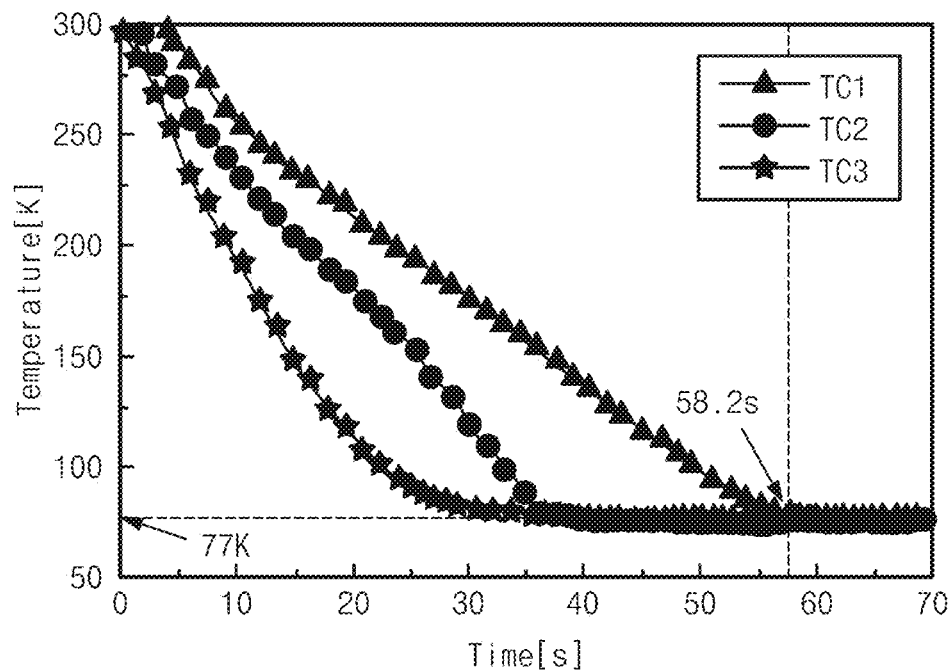
FIG. 4A and FIG. 4B are graphs showing the time to reach a very low temperature (77 K) from a room temperature when a carbon nanotube is added in an epoxy which is a component of a superconducting magnet.
Figure 4B:
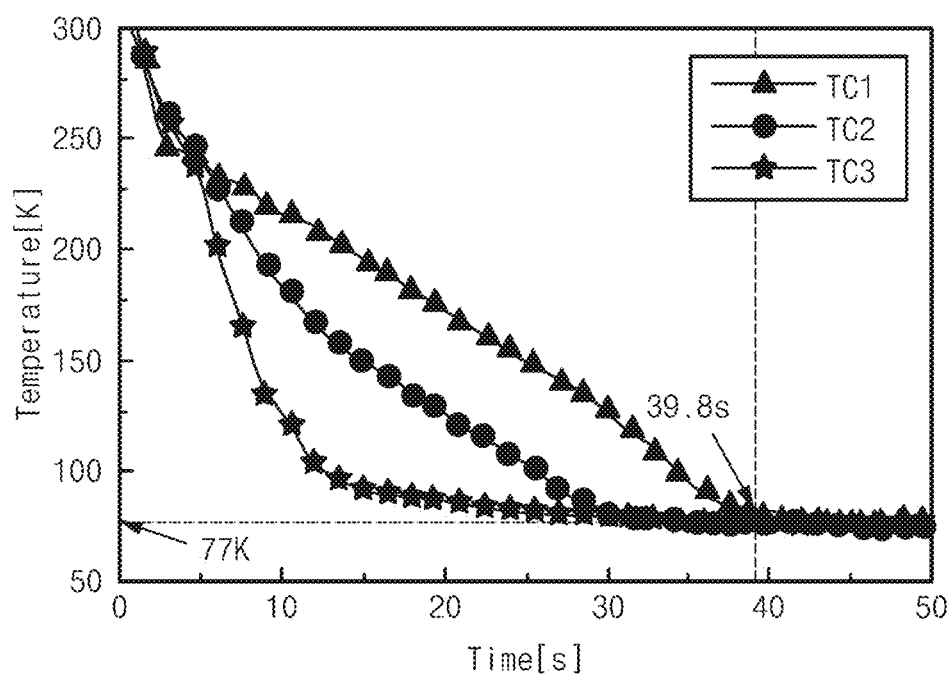

FIG. 4A and FIG. 4B are graphs showing the time to reach a very low temperature (77 K) from a room temperature when a carbon nanotube is added in an epoxy which is a component of a superconducting magnet.

In the superconducting magnet, thermocouples 160 at an innermost epoxy (TC1), a middle epoxy (TC2), and an outermost epoxy (TC3) were measured (See positions of the thermocouples 160 in FIG. 2).

FIG. 4A and FIG. 4B show the time at which the superconducting magnet containing the carbon nanotube in the epoxy reaches a very low temperature (77 K) from the room temperature. FIG. 4A shows the time to reach a very low temperature (77 K) from the room temperature when the non-surface-treated carbon nanotube is added. FIG. 4B shows the time to reach a very low temperature (77 K) from the room temperature when the surface-treated carbon nanotube is added. Experiments of reaching the very low temperature (77K) may be carried out by placing in liquid nitrogen.

With reference to FIG. 4A, when the non-surface-treated carbon nanotube is added, the time to reach the very low temperature (77K) of all the innermost epoxy (TC1), the middle epoxy (TC2), and the outermost epoxy (TC3) is 58.2 seconds.

With reference to FIG. 4B, when the surface-treated carbon nanotube is added, the time to reach the very low temperature (77K) of all the innermost epoxy (TC1), the middle epoxy (TC2), and the outermost epoxy (TC3) is 39.8 seconds.

On the other hand, when using only the epoxy without the carbon nanotube, the time to reach the very low temperature (77K) of all the innermost epoxy (TC1), the middle epoxy (TC2), and the outermost epoxy (TC3) is 468.1 seconds.

Accordingly, it may be confirmed that the time to reach the very low temperature (77K) of the superconducting magnet when the non-surface-treated carbon nanotube was added was 58.2 seconds, which has improved 7.0 times higher than that of 468.1 seconds when only the existing epoxy was added. Further, it may be confirmed that the time to reach the very low temperature (77K) of the superconducting magnet when the surface-treated carbon nanotube was added was 39.8 seconds, which has improved 11.8 times higher than that of 468.1 seconds when only the existing epoxy was added.

Therefore, it may be confirmed that, when the carbon nanotube is included, and particularly when the surface-treated carbon nanotube is added, due to efficient thermal conductivity, the superconducting magnet is cooled more quickly than when only the existing epoxy is added.

Figure 5A:
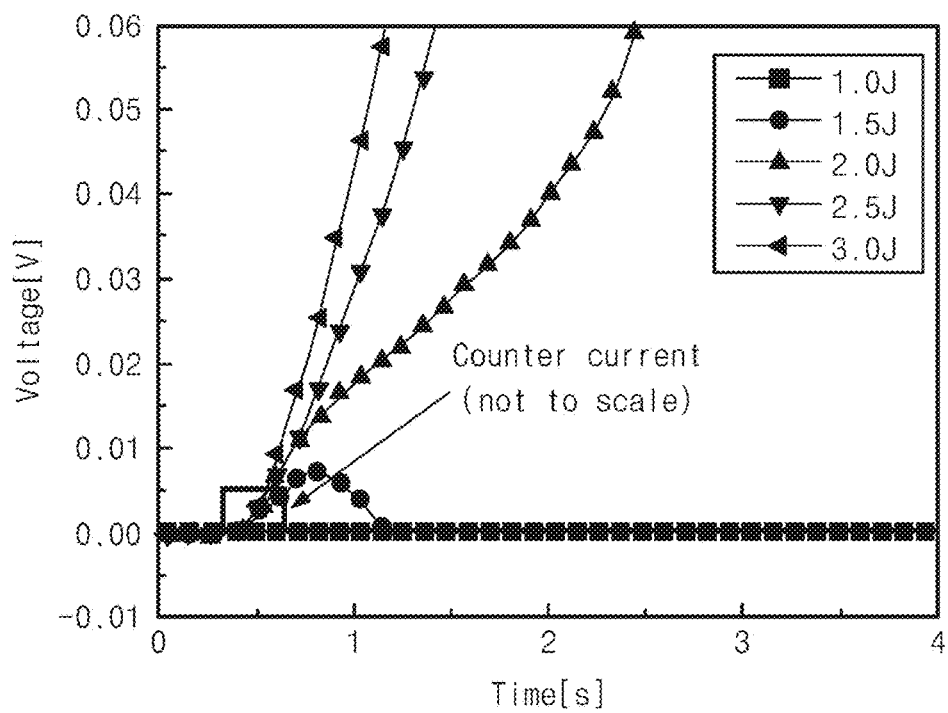
FIG. 5A and FIG. 5B are graphs showing a quench test of a superconducting magnet containing a carbon nanotube in an epoxy.
Figure 5B:
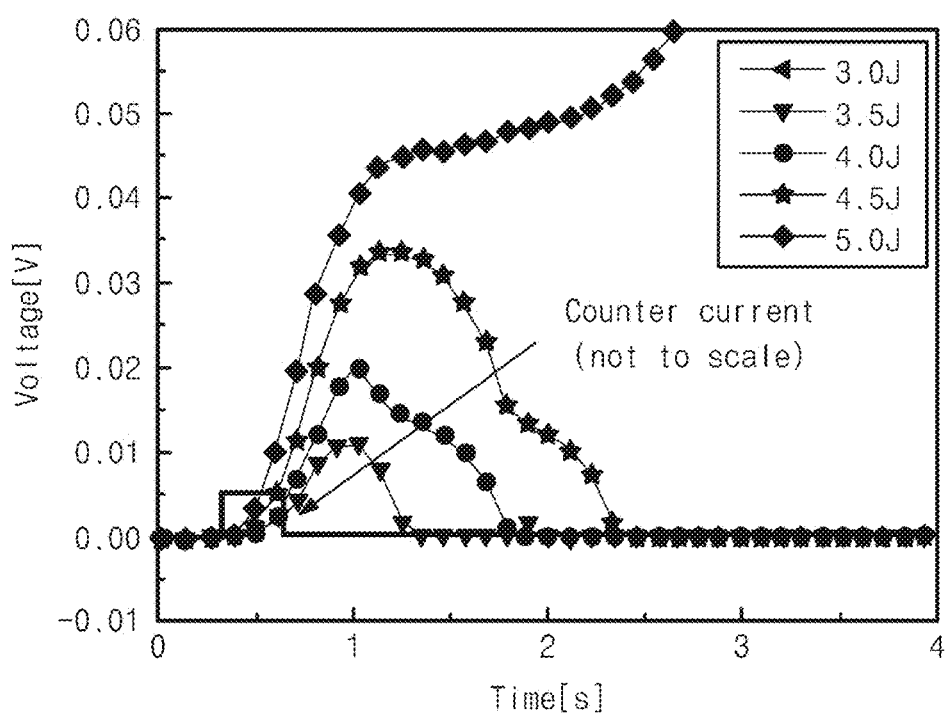

FIG. 5A and FIG. 5B are graphs showing a quench test of a superconducting magnet containing a carbon nanotube in an epoxy.

FIG. 5A shows a quench test when a non-surface-treated carbon nanotube 180 is added, and FIG. 5B shows a quench test when a surface-treated carbon nanotube is added.

The quench test may evaluate the thermal and electrical stabilities of the superconducting magnet 100 by applying an operating current of 93.6 A, and applying heat energy through a heater to confirm a minimum quench energy (MQE) that the quench is generated. It may be evaluated that the larger the MQE is, the higher thermal and electrical stabilities are.

In FIG. 5A, when the non-surface-treated carbon nanotube 180 was added, the minimum quench energy (MQE) was 2.0 J. On the other hand, in FIG. 5B, when the surface-treated carbon nanotube 190 was added, the minimum quench energy (MQE) was 5.0 J, which is 2.5 times higher than that of when the non-surface-treated carbon nanotube 180 was added. When the surface-treated carbon nanotube is impregnated with the epoxy, it may be evaluated more thermally and electrically stable.

Figure 6:
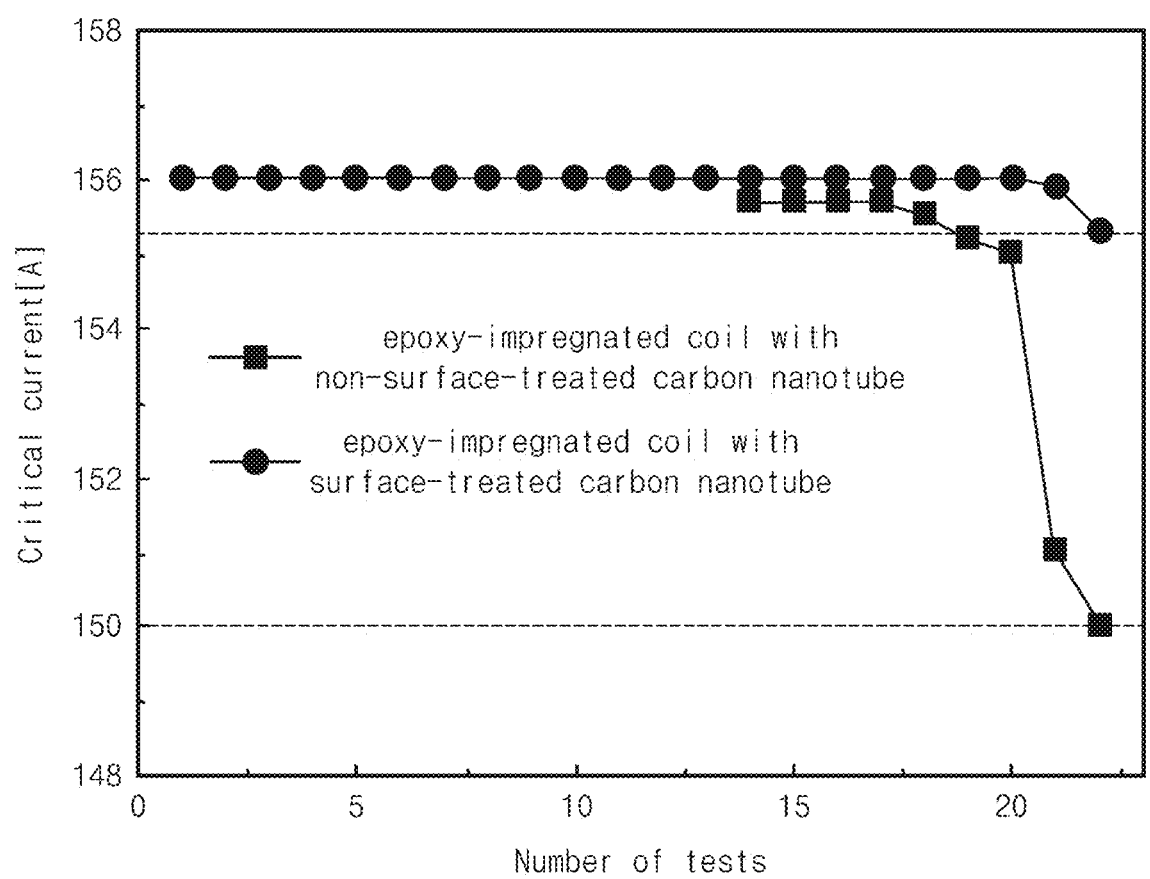
FIG. 6 shows critical current values obtained by repeating 22 times a process of cooling a superconducting magnet containing a carbon nanotube at room temperature, measuring the critical currents, and then heating it to the room temperature again.

FIG. 6 shows critical current values obtained by repeating 22 times a process of cooling a superconducting magnet containing a carbon nanotube at room temperature, measuring the critical currents, and then heating it to the room temperature again.

With reference to FIG. 6, the superconducting magnet 100 impregnated with the epoxy 130 containing the surface-treated carbon nanotube 190 shows less degradation of the superconductive property than the superconducting magnet impregnated with the epoxy 130 containing the non-surface-treated carbon nanotube 180.

It may be confirmed that the superconducting magnet 100 impregnated with the epoxy 130 containing the surface-treated carbon nanotube 190 showed no change in the critical current value until the 20th iteration, while the superconducting magnet 100 impregnated with the epoxy 130 containing the non-surface-treated carbon nanotube 180 showed falling of a critical current value from 14th iteration, so that it may be seen that a large number of the critical current value is reduced at 21th iteration.

This shows that the superconducting magnet 100 impregnated with the epoxy 130 containing the surface-treated carbon nanotube 190 has less difference in thermal shrinkage between the superconducting winding and the epoxy than the superconducting magnet impregnated with the epoxy 130 containing the non-surface-treated carbon nanotube 180.

The foregoing detailed description illustrates the inventive concept. In addition, the foregoing description illustrates preferred embodiments of the inventive concept, and the inventive concept may be used in a variety of different combinations, modifications and environments. That is, variations and modifications commensurate with the above teachings, within the skill or knowledge of the relevant art, are within the scope of the present invention. The embodiments described above have been provided to explain the best state in carrying out the inventive concept, and also may be modified in various forms required in specific application fields and usages of the inventive concept. Therefore, the detailed description of the inventive concept is not intended to limit the inventive concept to the disclosed embodiments. It is also to be understood that the appended claims are intended to cover other embodiments.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A superconducting magnet comprising:
   a bobbin defining a central portion of the superconducting magnet;
   a superconducting winding wound around an outer face of the bobbin; and
   an epoxy comprising an internal epoxy surrounding the superconducting winding such that the superconducting winding is impregnated in the internal epoxy, and an external epoxy separated from the internal epoxy and surrounding the internal epoxy surrounding the superconducting winding, wherein the epoxy contains surface-treated carbon nanotubes having a COOH functional group formed on surfaces of the carbon nanotubes to improve a thermal and electrical stability of the superconducting magnet and to reduce a difference in thermal shrinkage between the superconducting winding and the epoxy, and wherein a content of the carbon nanotubes contained in the epoxy is in a range of 0.1 to 5 wt % based on a total weight of the epoxy to improve a thermal conductivity of the epoxy, and wherein the internal epoxy and the external epoxy do not contact with each other.

2. The superconducting magnet of claim 1, wherein the carbon nanotubes are subjected to surface treatment such that the carbon nanotubes are dispersed in the epoxy at an increased dispersity in comparison to carbon nanotubes that are not subject to surface treatment.

3. The superconducting magnet of claim 2, wherein the surface-treatment of the carbon nanotubes includes heat-treating the carbon nanotubes in a solution containing sulfuric acid and nitric acid to form the COOH functional group on the surfaces of the carbon nanotubes.

* * * * *